(12) United States Patent
Liu et al.

(10) Patent No.: US 8,287,830 B2
(45) Date of Patent: Oct. 16, 2012

(54) DEVICES FOR PREPARING AMMONIUM BICARBONATE WITH FLUE GAS AND METHOD OF USING THE DEVICES

(76) Inventors: Jain Liu, Guangdong (CN); Zhiming Zhang, Liaoning (CN)

( * ) Notice: Subject to any disclaimer, the term of this patent is extended or adjusted under 35 U.S.C. 154(b) by 726 days.

(21) Appl. No.: 12/360,513

(22) Filed: Jan. 27, 2009

(65) Prior Publication Data
US 2009/0191114 A1    Jul. 30, 2009

(30) Foreign Application Priority Data

Jan. 28, 2008 (CN) .......................... 2008 1 0006960

(51) Int. Cl.
B01D 53/62 (2006.01)
C05C 11/00 (2006.01)
(52) U.S. Cl. ............ 423/234; 71/61; 422/168; 422/187
(58) Field of Classification Search .................. 423/234; 71/61; 422/168, 169, 170, 171, 172, 175, 422/178, 187; 110/203; 96/15, 242, 234; 165/177, 179, 185
See application file for complete search history.

(56) References Cited

U.S. PATENT DOCUMENTS

| | | | | |
|---|---|---|---|---|
| 4,602,673 A | * | 7/1986 | Michelfelder et al. | 165/7 |
| 4,797,141 A | * | 1/1989 | Mercader et al. | 62/635 |
| 4,925,633 A | * | 5/1990 | Doyle | 422/171 |
| 7,255,842 B1 | * | 8/2007 | Yeh et al. | 423/234 |
| 2005/0269069 A1 | * | 12/2005 | Hancock | 165/179 |
| 2009/0101012 A1 | * | 4/2009 | Gal et al. | 95/225 |

FOREIGN PATENT DOCUMENTS

| CN | 1356156 A | 7/2002 |
|---|---|---|
| CN | 1 833 756 A | 9/2006 |

OTHER PUBLICATIONS

Dong et al., "Experimental Study on Absorption of CO2 in Flue Gas by Hydrous Ammonia", Journal of Power Engineering, Jun. 2007, vol. 27 No. 3, pp. 438-440, 450.
Zhang et al., "New Nitrogen Fertilizer—Long Effective Ammonium Bicarbonate", Chemistry Industry Publishing, 2000, pp. 87-97.

* cited by examiner

*Primary Examiner* — Jill Warden
*Assistant Examiner* — Joye L Woodard
(74) *Attorney, Agent, or Firm* — Laurence A. Greenberg; Werner H. Stemer (57) ABSTRACT

The present invention relates to a method for preparing ammonium bicarbonate with flue gas and device thereof. The method includes quantitatively collecting flue gas with a carbon dioxide concentration of about 8% to about 15% (volume), decreasing the temperature of the flue gas to about 50° C. or less with an air-cooling apparatus, then increasing the pressure of the flue gas to about 0.4 to about 1.2 MPa, and finally allowing the flue gas to react with liquid ammonia to produce ammonium bicarbonate. The device for preparing ammonium bicarbonate with flue gas includes a flue gas collecting apparatus, an air-cooling apparatus, a gas storing and pressurizing apparatus and an ammonium bicarbonate synthesizing apparatus. The issue of energy consumption brought by conventional cooling approach using cooling water is addressed by using an air-cooling apparatus. Meanwhile, the use of $CO_2$ obtained from recycling the flue gas in synthesizing ammonium bicarbonate may achieve dual objects of not only reducing the discharge of $CO_2$ and improving the environment, but also producing nitrogen fertilizer.

21 Claims, 4 Drawing Sheets

DEVICES FOR PREPARING AMMONIUM BICARBONATE WITH FLUE GAS AND METHOD OF USING THE DEVICES

CROSS-REFERENCE TO RELATED APPLICATION

This application claims the priority, under 35 U.S.C. §119, of Chinese application CN 200810006960.3, filed Jan. 28, 2008; the prior application is herewith incorporated by reference in its entirety.

BACKGROUND OF THE INVENTION

Field of the Invention

The present invention relates to a method for preparing ammonium bicarbonate with flue gas and devices thereof.

The flue gas from industrial or municipal boilers burning coal, natural gas, petroleum or the discharged gas from incinerating biomaterial contains a large amount of pollutants such as $CO_2$, $SO_2$, $NO_x$, and dusts, etc. In order to reduce the pollution, the flue gas needs to be absorbed and processed before discharging. Currently, the process and utilization of flue gas mainly focuses on desulfurization, denitration and dust removing, while there are relatively less researches on the absorption and utilization of $CO_2$, which is the most predominant ingredient of flue gas. However, it is well known that $CO_2$ is currently one kind of green house gas with the largest production globally, and is an important factor for climate warming. The reduction of its discharge has received increasing attention of countries all around the world. How to remove $CO_2$ effectively and economically from industrial exhaust gas, especially from flue gas, becomes an exigent problem. On the other hand, $CO_2$ is an important raw material in food and chemical fertilizer industries. China is a large agricultural nation, in which both the demand and production for chemical fertilizer have reached No. 1 in the world. Among various chemical fertilizers, ammonium bicarbonate has long been one of the chemical fertilizers with the largest consumption in China, and still accounts for about 50% of the demand for nitrogen fertilizers now.

Long effective ammonium bicarbonate is a new highly effective nitrogen fertilizer developed independently by China. In the synthesizing procedure of the fertilizer, an ammonium stabilizer (DCD, NMC) is incorporated, which successfully solves the problems of short effective fertilizer duration, large evaporation loss, low utilization of $CO_2$ and nitrogen, and has a large economic benefit. The specified synthesizing method as well as the effect thereof is discussed in detail in Chinese Patent CN1039901C, which is incorporated herein in its entity by reference.

In China, the conventional method for producing of ammonium bicarbonate, especially long effective ammonium bicarbonate, may be performed by using coal or natural gas as the raw material, and absorbing the shift conversion gas generated by burning the fuel with ammonia water, wherein when the natural gas is used as the raw material, it should be aided with burning limekiln gas to supplement the shortage of $CO_2$ in the process of ammonia synthesis with natural gas. However, all of these methods needs the consumption of a lot of energy or fuel resources, and meanwhile it may further increase the discharge of greenhouse gas $CO_2$, deviating from the spirit of environmental protection. However, if the $CO_2$ recycled from the flue gas may be used instead of the $CO_2$ produced from burning fossil fuels, obviously there will be enormous environmental as well as economical dual values at the same time.

Currently, there are two approaches to recycle and utilize the $CO_2$ in the flue gas: one is subjecting the flue gas to multiple steps of absorbing, impurities removing, recovering and the like, obtaining the final product $CO_2$, and then subject the gas to corresponding reaction to prepare the chemical fertilizer. The method usually used in industry is alcohol-amine method, but the method has the shortcomings such as complex steps, large consumption of absorbing agents and energy, the susceptibility of the devices to erosion, sensitivity to impurities such as $SO_2$ and $O_2$ contained in the flue gas. The other is to directly absorb the $CO_2$ in the flue gas with ammonia water to produce ammonium bicarbonate, but there has been no successful operation experience for this method yet in China. The technical problem thereof lies in that it is relatively difficult to match the technical parameters of prior art required for producing ammonium bicarbonate chemical fertilizer using shift conversion gas with the flue gas discharged directly from a refinery and the like. When the ammonium bicarbonate chemical fertilizer is produced by the prior art, the concentration of $CO_2$ in the shift conversion gas is about 25%~30%, while the concentration of $CO_2$ in the flue gas is about 10%~15%, which is nearly one half lower than the ordinary content; furthermore, when producing the ammonium bicarbonate chemical fertilizer using the shift conversion gas, the pressure is 0.6~1.2 MPa (about 6~12 atmospheres), while the $CO_2$ pressure of the flue gas is merely atmosphere or a little higher than atmosphere, which leads to a reduction of $CO_2$ absorption rate, difficulties for the crystallization of the chemical fertilizer, as well as an increase in the $CO_2$ content in the exhaust gas; furthermore, the temperature of the flue gas at the vent is about 200-300° C., and generally 150-200° C. after heat exchange, such a high temperature is disadvantageous for the absorption of $CO_2$, thus it usually needs to be cooled down. A common cooling apparatus is water-cooling, but a lot of water resource will be wasted. Meanwhile, thermal power plant, which is one of the main sources of the flue gas, usually locates in the district short of water resources, such a contradiction is also one of the reasons that limit the application of the technique.

CN1833756A discloses a technical method with a high removing efficiency for removing $CO_2$ in flue gas. The patent uses an ultramultiple absorption process, absorbs the carbon dioxide in flue gas from the boiler of a power plant under atmosphere pressure and produces solid of ammonium carbonate salts, which may be used as nitrogen fertilizers. However, the patent only shows that the absorption of $CO_2$ is good, and does not set out the constituents and practical fertilizer effect of the ammonium carbonate salts. Moreover, the invention does not explore the optimized manufacturing conditions for producing such ammonium carbonate salts. Thus, there is a need for a convenient and facile process which is easy to popularize and carry out for absorbing and utilizing $CO_2$ in the flue gas to make ammonium bicarbonate, especially long effective ammonium bicarbonate.

SUMMARY OF INVENTION

The present invention aims to obtain a convenient and facile process which is easy for popularization and implementation and is compatible with existing apparatus such as boilers and the like, for making ammonium bicarbonate, especially long effective ammonium bicarbonate, by absorbing and utilizing $CO_2$ in flue gas through choosing technical parameters such as concentration of ammonia water, reaction temperature, reaction pressure and corresponding devices, etc.

One aspect of the present invention provides a method for preparing ammonium bicarbonate with flue gas, the method comprising:
(1) quantitatively collecting flue gas with a carbon dioxide concentration of about 8% to about 15% (volume);
(2) decreasing the temperature of the flue gas to about 50° C. or less with an air-cooling apparatus;
(3) increasing the pressure of the flue gas to about 0.4 to about 1.2 MPa; and
(4) allowing the flue gas to react with ammonia to produce the ammonium bicarbonate.

In one embodiment of the present invention, the dust content of the flue gas is decreased to less than about 150 mg/m$^3$, and preferably to less than about 45 mg/m$^3$ before the step (2). In another embodiment of the present invention, the dust content of the flue gas is decreased to less than about 100 mg/m$^3$, and preferably to less than about 45 mg/m$^3$ at the same time of the step (2).

In one embodiment of the present invention, the temperature of the flue gas of the step (1) is about 150 to about 200° C.

In one embodiment of the present invention, the flue gas of the step (1) is provided by controlling the amount of inlet gas at a boiler entrance.

In one embodiment of the present invention, the flue gas of the step (1) acting as the raw material of the present invention is derived from the flue gas of a boiler burning coal, natural gas, petroleum, or from the exhaust gas of incinerating biomaterial, the boiler is preferably a coal-burning boiler of a thermal power plant, and preferably the flue gas of the step (1) is the flue gas with a carbon dioxide concentration of about 10% to about 15% (volume).

The raw material may also be flue gas discharged from boilers burning biomaterial such as straw or town refuse.

In a preferred embodiment of the present invention, the ammonia of the step (4) is ammonia water with a concentration of more than about 170 titter.

Another aspect of the present invention is to provide a device for preparing ammonium bicarbonate with flue gas, the device comprising:
(1) a flue gas collecting apparatus disposed downstream of an exhaust outlet of a boiler for quantitatively collecting flue gas;
(2) an air-cooling apparatus disposed downstream of the flue gas collecting apparatus for decreasing the temperature of the flue gas to about 50° C. or less;
(3) a gas storing and pressurizing apparatus for storing the cooled flue gas and increasing the pressure of the cooled flue gas to about 0.4 to about 1.2 MPa; and
(4) an ammonium bicarbonate synthesizing apparatus for allowing the pressured flue gas to react with ammonia to produce the ammonium bicarbonate.

In a preferred embodiment of the present invention, the flue gas collecting apparatus comprises a partitioning plate and a valve mounted at the exhaust outlet of the boiler for shunting flue gas.

In a preferred embodiment of the present invention, the air-cooling apparatus comprises an air-cooling channel, wherein the air-cooling channel is a piping which comprises at least one thin steel pipe with a pipe wall thickness of about 3 mm to about 4 mm and an outer diameter of about 20 to about 30 cm. Preferably, the thin steel pipe is made of 20# ordinary carbon steel.

In a preferred embodiment of the present invention, the piping comprises more than one thin steel pipes, which may be connected in parallel or in series. When the thin steel pipes are connected in series, the overall length of the thin steel pipe is about 80 m to about 120 m; while when the thin steel pipe is connected in parallel, each of the thin steel pipes is about 30 m in length, and the number of the thin steel pipes is about 20 to about 40.

In a preferred embodiment of the present invention, the device further comprises a dust removing apparatus disposed between the flue gas collecting apparatus and the air-cooling apparatus. In another embodiment, the device further comprises a dust removing apparatus disposed within the air-cooling apparatus. The dust removing apparatus is an electric dust removing apparatus.

In a preferred embodiment of the present invention, a gas holder is disposed within the gas storing and pressurizing apparatus, and preferably the volume of the gas holder is about 100 to about 150 m$^3$.

In a preferred embodiment of the present invention, the ammonium bicarbonate synthesizing apparatus comprises:
A. a carbonization main column, which is a counter flow reacting apparatus for concentrated ammonia water with a concentration of more than about 170 titer and carbon dioxide, wherein the bottom of the carbonization main column receives pressurized flue gas from the gas storing and pressurizing apparatus, and generated ammonium bicarbonate solid suspension is led out from the bottom with reduced pressure, while unabsorbed gas is discharged from the top of the carbonization main column;
B. a carbonization auxiliary column, which is a counter flow reacting apparatus for concentrated ammonia water with a concentration of more than about 170 titer and carbon dioxide, wherein the bottom of the carbonization auxiliary column receives the unabsorbed flue gas discharged from the top of the carbonization main column, the resultant absorbing liquid is led out from the bottom and input into the top of the carbonization main column, while unabsorbed gas is discharged from the top of the carbonization auxiliary column;
C. a comprehensive column comprising a lower fixed section and an upper recovery and rinse section, the unabsorbed gas discharged from the top of the carbonization auxiliary column entering into the lower fixed section of the comprehensive column, wherein $CO_2$ and $H_2S$ in the unabsorbed gas discharged from the top of the carbonization auxiliary column are absorbed by dilute ammonia water with a concentration of less than about 50 titer, the unabsorbed gas enters into the upper recovery and rinse section of the comprehensive column and is vented after $CO_2$ and $NH_3$ therein being further absorbed by soft water and after energy recovery and depressurization;
D. an ammonia absorbing system, wherein the dilute ammonia water after absorbing the flue gas in the comprehensive column passes through a dilute ammonia water tank, and then enters into an ammonia water cycling tank to mix with mother liquid in the ammonia water cycling tank, enters into an upper ammonia absorber through an ammonia water pump, mixes with the raw ammonia gas, thereby the ammonia gas is absorbed, and the liberated heat is removed by cooling water in an ammonia absorbing cooling grid, the resultant concentrated ammonia water enters into a concentrated ammonia tank, and is then transported to the top of the carbonization auxiliary column by a concentrated ammonia water pump; and
E. a separating system, comprising a thickener and a centrifuge, wherein the ammonium bicarbonate solid suspension from the bottom of the carbonization main column is led out with reduced pressure, fed into the thickener, and then separated by the centrifuge to generate the final product of ammonium bicarbonate and mother liquid, the mother liquid is sent back to the ammonia water cycling tank and then sent back to the ammonia absorbing system by the ammonia water pump.

In some embodiments, ammonium stabilizers dicyanocabamidine (DCD) and nano-carbon (NMC) may be dissolved in concentrated ammonia water in a scientific addition amount, and then react with CO2 in flue gas to yield long effective ammonium bicarbonate. This method and product thereof is described in detail in No. 200710142932.X, filed by the present applicants on Aug. 10, 2007, which is incorporated herein in its entity by reference. While the concentrated ammonia water compounding with the flue gas containing $CO_2$ to form long effective ammonium bicarbonate, the dicyanoacabamidine (DCD) and nano-carbon (NMC) will synchronously crystallize in the form of cocrystal or mixture. In the resultant product, the amount of dicyanoacabamidine (DCD) and nano-carbon (NMC) are 0.1-1% (weight) and 0.2-0.7% (weight) respectively. In the embodiments of producing long effective ammonium bicarbonate, the temperature of the carbonization column is the key factor that determines whether or not the long effective ammonium bicarbonate may be formed. The temperature may vary between 24 to 42° C., and preferably is less than 38° C.

The long effective ammonium bicarbonate produced by the present invention has the characteristics of high utilization of nitrogen and long effective duration, and may be applied as base fertilizer, avoiding the step of adding additional fertilizers. The production enhancement may be up to 20%~80% with significant economic benefits. Meanwhile, the fertilizer may increase the soil fixed rate of $CO_2$ by 30%~50%, increase the plant fixed rate of $CO_2$ by 15%~20%, reduce the $N_2O$-discharge amount of soil by 60%~70%, and have obvious environmental benefits. The fertilizer produced by the process has the characteristics of even ammonium stabilizer distribution, small dosage, saved cost, and good production increase effect and environmental effect.

The present invention directly uses the flue gas from the industry such as thermal power plant as raw material, quantitatively collects the flue gas with a $CO_2$ concentration of 8%~15% (volume), and uses an air-cooling devices formed by thin steel pipe to air-cool the flue gas to solve the problem of energy wasting in conventional methods that use cooling water for cooling. Meanwhile, the pressure of the flue gas is increased to 0.4-1.2 MPa. Using the $CO_2$ recycled by the method described above for synthesizing ammonium bicarbonate, especially long effective ammonium bicarbonate fertilizer, the dual objects of not only reducing $CO_2$ discharge and improving environment, but also producing nitrogen fertilizer and saving cost are achieved.

In addition, it is of no need to desulfurize and denitrificate the flue gas discharged by the boiler when producing ammonium bicarbonate with flue gas by using the method of the present invention. The sulfur oxides and nitrogen oxides in the flue gas also take part in the reaction with ammonia. The costs and devices required for processing the waste gas directly discharged from the boiler are saved.

Other features which are considered as characteristic for the invention are set forth in the appended claims.

Although the invention is illustrated and described herein as embodied in a method for preparing ammonium bicarbonate with flue gas and devices thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

DETAILED DESCRIPTION OF THE INVENTION

In the description below, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

The followings are further specification on the content of the present invention in combination with the accompanying drawings.

Figure 1:
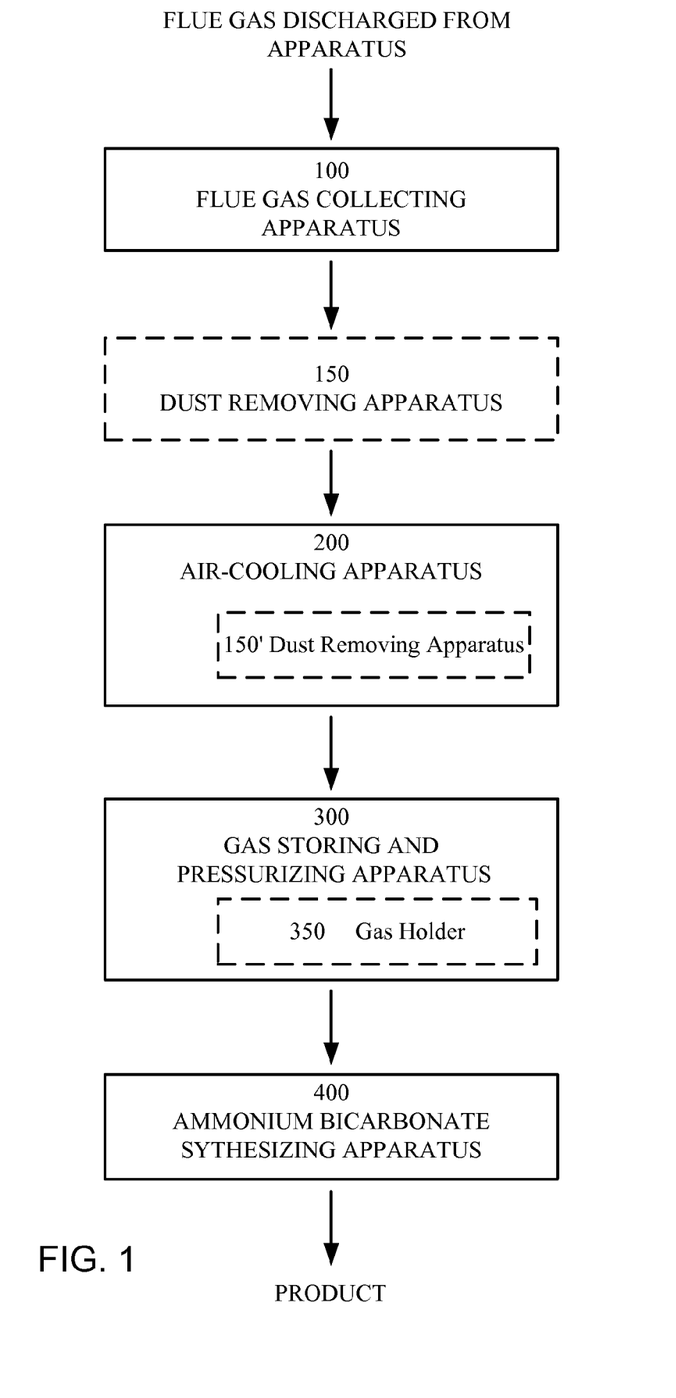
FIG. 1 shows a flow chart of preparing ammonium bicarbonate with flue gas according to the present invention.

As shown in FIG. 1, the flue gas discharged from the boiler with a temperature of 150-200° C. firstly enters into a flue gas collecting apparatus (100) to be quantitatively collected, cooled to 50° C. or lower by an air-cooling apparatus (200), then enters into a gas storing and pressurizing apparatus (300), allowing the pressure of the flue gas to be increased to 0.4-1.2 MPa, and finally passes an ammonium bicarbonate synthesizing apparatus (400) to produce product.

According to the method for producing ammonium bicarbonate with flue gas, the flue gas of the step (1) is applied by controlling the inlet gas amount at the entrance of the boiler. In order to control the stability of the $CO_2$ concentration in the air-cooled flue gas, with the condition of ensuring sufficient oxygen for combustion being satisfied, the air amount entering into the furnace should be strictly controlled so as to reduce the discharge amount of the boiler as much as possible.

The flue gas is obtained from the flue gas of boiler burning coal, natural gas, petroleum or discharged gas of incinerating biomaterial, wherein the boiler is coal-burning boiler of thermal power plant, and the biomaterial is straw or town refuse.

In one embodiment of the present invention, the flue gas collecting apparatus (100) may comprise at least one flue shunting partitioning plate which controls the flow of the flue gas and a shunting-controlling valve which adjusts the amount of inlet gas. The flue shunting partitioning plate is disposed at an outlet of a boiler exhaust chimney to control the flow of the flue gas, and the amount of inlet gas is adjusted by the valve, thereby the flue gas is quantitatively collected.

According to the method for producing ammonium bicarbonate with flue gas, the flue gas temperature of the step (1) is 150-200° C. Therefore, the difficulty to utilize the flue gas is to reduce the temperature of the flue gas. When the temperature of the flue gas is reduced from about 150-200° C. to about 40-50° C., it may react with concentrated ammonia water to yield ammonium bicarbonate. If cycling water is used to cool, a large amount of water resources will be wasted, to bring about new energy problems. Meanwhile, thermal power plants, which are one of the major sources of flue gas, usually locate in districts which are relatively short of water resource. If a water-cooling apparatus was used, it may be difficult to ensure the supply of water needed for the process. The present invention therefore selects air-cooling of the flue gas to prepare ammonium bicarbonate.

Figure 2:
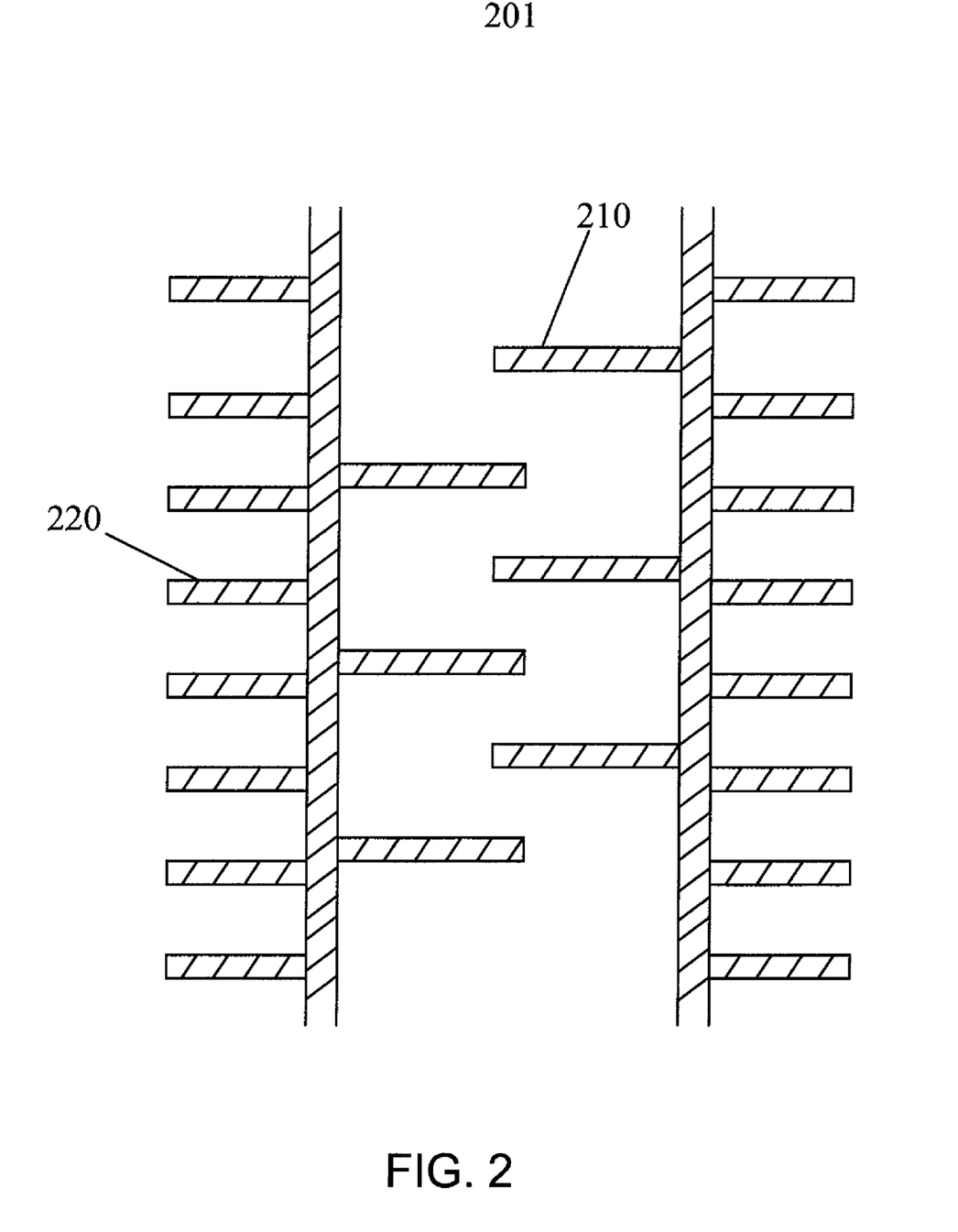
FIG. 2 shows a scheme diagram of an air-cooling channel (201)

In one embodiment of the present invention, the air-cooling apparatus (200) may be a air-cooling channel (201). The air-cooling channel (201) may be made of any material that may conduct heat, preferably these materials are materials resistant to erosion of flue gas, such as steel pipe or cast steel pipe. Those skilled in the art may understand that other materials having heat conducting property and resistant to erosion may also be used.

According to the cooling effect needed to be achieved, those skilled in the art may understand that the air-cooling channel may be of any shape or dimension known in the art. As shown in FIG. 2, the air-cooling channel (201) may be made of 20# ordinary carbon steel. In order to provide cooling effect with high efficiency, multiple flue gas blocking boards (210) may be disposed in the channel, and multiple radiating fins (220) may be disposed outside the channel, those skilled in the art may determine the disposing manner and number of the flue gas blocking boards (210) and radiating fins (220) according to the flow of the flue gas and the temperature to be decreased. Various shapes of radiating fins known in the art may be used in the present invention as needed.

The inventor of the present application discovered that because the 20# ordinary carbon steel (the carbon content in the steel is 0.17%~0.24%) has relatively good plasticity and toughness, may be processed by cold machining or hot machining, and has good weldability, the air-cooling pipe made of such steel may provide good air-cooling effect.

It has been discovered after research that choosing thin steel pipe with a pipe wall thickness of 3-5 mm and an outer diameter of 20-30 cm may provide the required cooling effect.

Air-cooling pipes made of other materials (such as cast steel) may also be possible. When an air-cooling pipe made of cast steel is used, its thickness should be larger than that of the foregoing steel pipe. It will be understood by those skilled in the art that a same air-cooling effect may also be achieved by adjusting the pipe wall thickness, outer diameter and the length needed.

In the air-cooling apparatus (200), the connecting manner of the thin steel pipes may be in series or in parallel. If the flue gas is far from the carbonization column, thin steel pipe air-cooling apparatus connected in series may be chosen. If the flue gas is near the carbonization column, thin steel pipe air-cooling apparatus connected in parallel may be chosen.

The number of the thin steel pipes connected in parallel is preferably about 20-40. The length of the thin steel pipe should be determined by the effect of temperature reducing, and is preferably about 30 m, suitable for installation and maintenance. The length of the thin steel pipe connected in series should be determined by the effect of temperature reducing, and is preferably about 80-120 m, the designed height and curvature should be suitable for installation and maintenance.

According to the change of environment all around, a forced ventilating apparatus may be disposed outside the air-cooling channel to ensure the cooling effect.

The temperature of the flue gas is reduced to 50° C. or less after the air-cooling apparatus, to satisfy the requirement to the temperature of raw material in the subsequent ammonium bicarbonate synthesizing step.

In still other embodiments of the present invention, a dust removing apparatus (150) is disposed between the flue gas collecting apparatus (100) and the air-cooling apparatus (200) to enhance the air-cooling effect of the thin steel pipe radiating fin on the flue gas, prevent the accumulation of dust, and reduce the resistance. Alternatively, in other embodiments, the dust removing apparatus (150') may be disposed within the air-cooling apparatus, especially when the air-cooling channel is of a vertical type (not shown). The specification of electrical dust removing apparatus is preferably 0.4-1.5 m/s, and the controlled amount of dust removing is 40-150 mg/m$^3$.

The flue gas is cooled to 50° C. or less after passing through the air-cooling apparatus (200), and then enters into a gas storing and pressurizing apparatus (300).

In some embodiments of the present invention, the gas storing and pressurizing apparatus (300) may comprise a gas holder (350) and a pressurizing input pump, in order to store sufficient flue gas containing $CO_2$ to prepare ammonium bicarbonate. The flue gas stored in the gas holder enters into an ammonium bicarbonate synthesizing apparatus (400) after the pressure of the flue gas is increased to 0.4-1.2 MPa by the pressurizing input pump.

Figure 3:
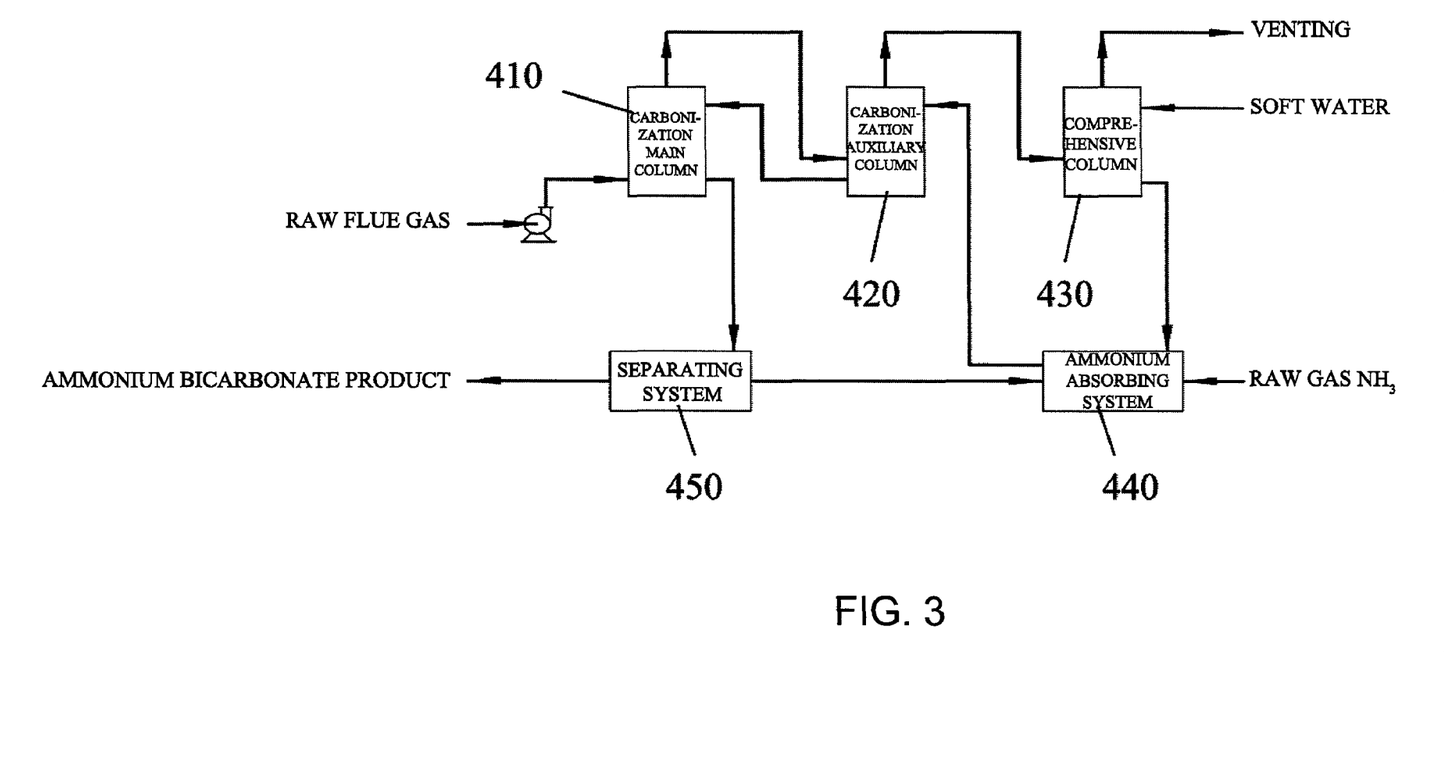
FIG. 3 shows a scheme diagram of an ammonium bicarbonate synthesizing apparatus (400) according to the device of the present invention.
Figure 4:
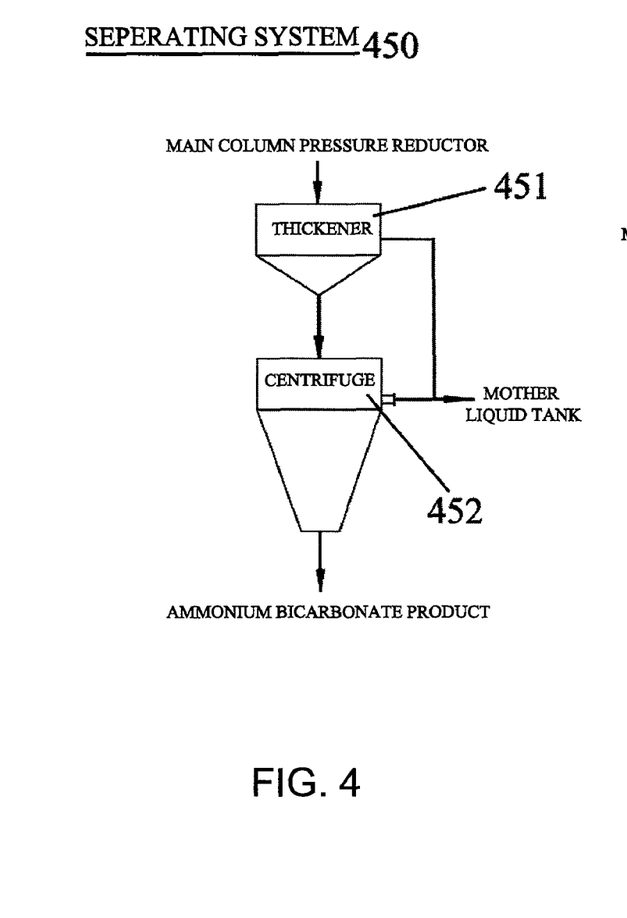
FIG. 4 shows a scheme diagram of a separating system (450) according to the device of the present invention.
Figure 5:
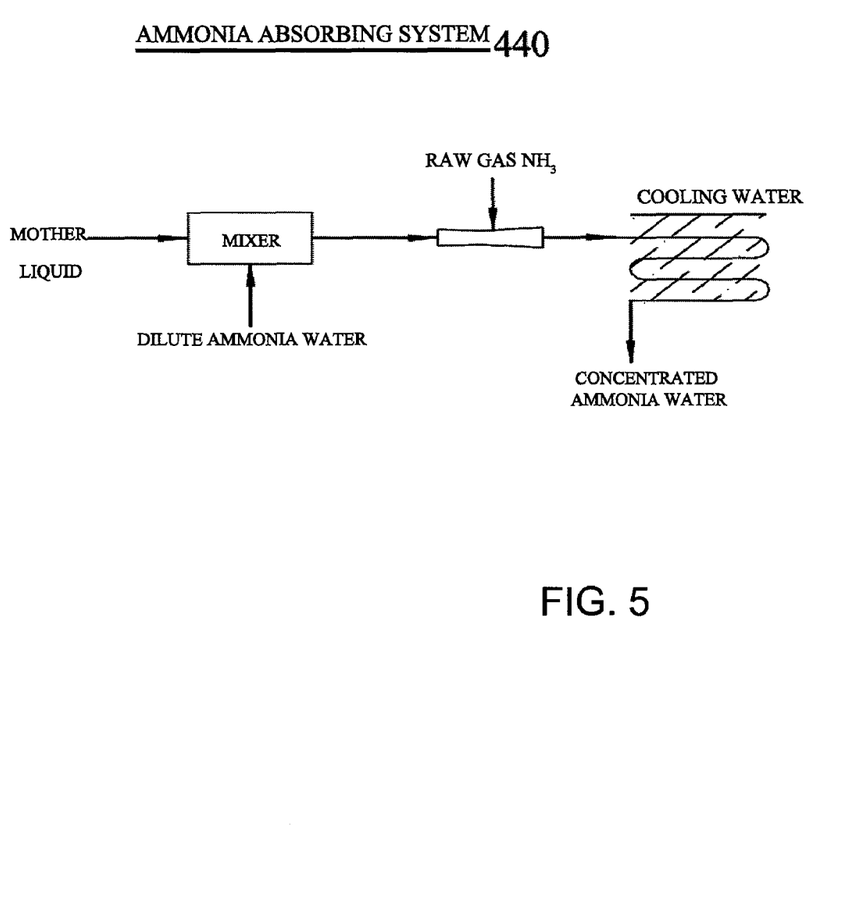
FIG. 5 shows a scheme diagram of an ammonia absorbing system (440) according to the device of the present invention.

The ammonium bicarbonate synthesizing process may be carried out using any ammonium bicarbonate synthesizing apparatus known in the art. Preferably, the ammonium bicarbonate synthesizing apparatus (400) (see FIG. 3) of the present invention comprises:

A. a carbonization main column (410), wherein the flue gas with 10%-15% (volume) $CO_2$ and a pressure of 0.4-1.2 MPa enters into a bottom of the carbonization main column, contacts in a counter flow with the solution of a carbonization auxiliary column which enters from a top of the carbonization main column to absorb most of the $CO_2$;

B. a carbonization auxiliary column (420), wherein the unabsorbed flue gas with a $CO_2$ concentration of 4% (volume) is discharged from the top of the carbonization main column and enters into a bottom of the carbonization auxiliary column, contacts in a counter flow with concentrated ammonia water which enters from a top of the carbonization auxiliary column to continue to absorb $CO_2$;

C. a comprehensive column (430), wherein exhaust gas containing about 0.4% $CO_2$, a small amount of $NH_3$ and $H_2S$ is discharged from the top of the carbonization auxiliary column, enters into a lower fixed section of the comprehensive column, wherein $CO_2$ and $H_2S$ are absorbed by dilute ammonia water, the flue gas after absorption enters into an upper recovery and rinse section of the comprehensive column, and $CO_2$ and $NH_3$ in the flue gas are further absorbed by soft water, the flue gas discharged from a top of the comprehensive column contains $CO_2 \leqq 0.2\%$ (volume), $NH_3 \leqq 0.2$ g/Nm$^3$, and is then vented after energy recovery and depressurization;

D. an ammonia absorbing system (440) (see FIG. 5), wherein the dilute ammonia water in which the flue gas has been absorbed in the comprehensive column passes through a dilute ammonia water tank, and then enters into an ammonia water cycling tank to be mixed with mother liquid in the ammonia water cycling tank, enters into an upper ammonia absorber through an ammonia water pump, mixes with raw ammonia gas, wherein the ammonia gas is absorbed, and the liberated heat is removed by cooling water in an ammonia absorbing cooling row, the resultant concentrated ammonia water enters into a concentrated ammonia tank, and is then transported to the top of the carbonization auxiliary column by a concentrated ammonia water pump;

E. a separating system (450) (see FIG. 4), wherein ammonium bicarbonate solid suspension generated in the carbonization main column is led out via a pressure reductor with reduced pressure, fed into a thickener (451), and then separated by a centrifuge (452) to generate the final product of ammonium bicarbonate and mother liquid, the mother liquid is sent back to the ammonia water cycling tank and then sent back to the ammonia absorbing system by the ammonia water pump.

In the ammonium bicarbonate synthesizing apparatus, the pressure range of the carbonization main column and carbonization auxiliary column is 0.4-1.2 MPa, and the concentration range of the reacting ammonia water is 5%-12%.

The sulfur oxides and nitrogen oxides contained in the flue gas discharged from the boiler will also take part in the reaction with ammonia, and the reaction product thereof is also used as an ingredient of the chemical fertilizer. The costs and devices for waste gas processing needed upon the direct discharge of the boiler are saved.

Preferably, the ammonium stabilizers dicyanocabamidine (DCD) and nano-carbon (NMC) may be dissolved in concentrated ammonia water in a required amount, and then reacts with $CO_2$ in flue gas, thus long effective ammonium bicarbonate may be yield. When the concentrated ammonia water reacts with $CO_2$ contained in the flue gas to form long effective ammonium bicarbonate, the dicyanoacabamidine (DCD) and nano-carbon (NMC) will crystallize in the form of cocrystal or mixture at the same time.

EXAMPLE 1

Flue gas discharged from a coal burning boiler of a thermal power plant, with a dust content of 40 mg/m$^3$~140 mg/m$^3$, a temperature of about 160° C., and a $CO_2$ concentration of about 10% (volume) firstly enters into a flue gas collecting apparatus. Because the flue gas has a pressure of 0.25-0.45 MPa at its outlet, multiple wind power generator sets can be equipped in the discharging route of flue gas to generate electric power by using the wind energy of the flue gas. A flue gas shunting plate is mounted at the outlet of the boiler exhaust chimney to control the flow of the flue gas, the amount of inlet gas is adjusted by a valve, and the flue gas with the $CO_2$ concentration of about 10% (volume) is quantitatively collected.

The flue gas with a dust content of 40 mg/m$^3$~140 mg/m$^3$, a temperature of about 160° C., and a $CO_2$ concentration of about 10% (volume) enters into a parallel thin steel pipe cooling apparatus. The thin steel pipe is 20# ordinary carbon steel, the diameter is 25 cm, the number of pipes connected in parallel is 30, and the length is 30 m. Radiating fins are welded outside the outer wall of the thin steel pipe to enhance the radiating rate, and flue gas blocking boards are mounted at the inner wall of the thin steel pipe to ensure the effect of cooling the flue gas, reducing the temperature to about 40° C.

The flue gas with a dust content of 40 mg/m$^3$~140 mg/m$^3$, a temperature of about 40° C., and a $CO_2$ concentration of about 10% (volume) enters into a gas storing and pressurizing apparatus by a screw air compressor to increase the pressure to 0.4-0.6 MPa. The flue gas firstly enters into a gas holder which is 120 m$^3$ in volume to store enough flue gas containing $CO_2$ for producing ammonium bicarbonate. Then the flue gas is fed into a pressurizing input pump, and the pressure is kept at about 0.4 MPa.

The flue gas with a temperature of about 40° C., a pressure of about 0.4 MPa, a dust content of 40 mg/m$^3$~140 mg/m$^3$, and a $CO_2$ concentration of about 10% (volume) finally enters into an ammonium bicarbonate synthesizing apparatus. The flue gas firstly enters into the bottom of a carbonization main column, contacts in a counter flow with solution of a carbonization auxiliary column (ammonia water with a concentration of 7%) which enters from the top of the carbonization main column to absorb most of the $CO_2$; the unabsorbed flue gas with a $CO_2$ concentration of 4% (volume) is discharged from the top of the carbonization main column and enters into the bottom of the carbonization auxiliary column, contacts in a counter flow with the concentrated ammonia water with a concentration of 12% which enters from the top of the carbonization auxiliary column to continue to absorb $CO_2$; the exhaust gas containing about 0.4% of $CO_2$, a small amount of $NH_3$ and $H_2S$ is discharged from the top of the carbonization auxiliary column, enters into the lower fixed section of a comprehensive column, wherein $CO_2$ and a small amount of $H_2S$ gas are absorbed by dilute ammonia water, the flue gas after the absorption enters into the upper recovery and rinse section of the comprehensive column and $CO_2$ and ammonia in the flue gas are further absorbed by soft water, and the flue gas discharged from the top of the comprehensive column contains $CO_2 \leqq 0.2\%$ (volume), ammonia $\leqq 0.2$ g/Nm$^3$, and is then vented after energy recovery and depressurization. The dilute ammonia water in which the flue gas has been absorbed by the comprehensive column passes through a dilute ammonia water tank, and then enters into an ammonia water cycling tank to be mixed with mother liquid in the ammonia water cycling tank, enters into an upper ammonia absorber through an ammonia water pump, mixes with the raw ammonia gas, the ammonia gas is absorbed, and the liberated heat is removed by the cooling water in an ammonia absorbing cooling row, the resultant concentrated ammonia water enters into concentrated ammonia tank, and is then transported to the top of the carbonization auxiliary column by a concentrated ammonia water pump. The ammonium bicarbonate solid suspension generated in the carbonization main column is led out with reduced pressure, fed into a thickener, and then separated by a centrifuge to generate the final product of ammonium bicarbonate and mother liquid, the mother liquid is sent back to the ammonia water cycling tank and then sent back to the ammonia absorbing system by the ammonia water pump.

The generated ammonium bicarbonate solid suspension is led out from the bottom of the carbonization main column, in which the ratio of solid-to-liquid is 6:4. The generated ammonium bicarbonate solid suspension is led out with reduced pressure from the bottom of the carbonization main column through a way selected from a continuous process or a batch process. The discharged ammonium bicarbonate solid suspension is fed into a thickener. The crystallized ammonium bicarbonate is increased in amount in the thickener, and then is separated by a centrifuge to generate the final product of ammonium bicarbonate and mother liquid. The mother liquid is sent back to a crystal-liquid tank and the crystal-liquid precipitation may further proceed. And then the crystallized ammonium bicarbonate is obtained thorough a centrifuge. On the basis of the ammonium bicarbonate producing device, a system for dissolving, storing and incorporating additives (nano-carbon and DCD) can be introduced into the device such that a co-crystallization product of a mixture with ammonium bicarbonate can be produced i.e., a nano-carbon long-sustaining fertilizer is produced.

By using a carbonization column with a diameter of 2.4 m, 3.8 tons of ammonium bicarbonate can be produced every hour, 91 tons of ammonium bicarbonate can be produced every 24 hours, and 30,000 tons of ammonium bicarbonate can be produced every year.

EXAMPLE 2

Flue gas discharged from a coal burning boiler of a thermal power plant, with a dust content of about 150 mg/m$^3$, a temperature of about 180° C., and a $CO_2$ concentration of about 12% (volume) firstly enters into a flue gas collecting apparatus. Because the flue gas has a pressure of 0.25-0.45 MPa at its outlet, multiple wind power generator sets can be equipped in the discharging route of flue gas to generate electric power by using the wind energy of the flue gas. A flue gas shunting board is mounted at the outlet of the boiler exhaust chimney control the flow of the flue gas, and the amount of inlet gas is adjusted by a valve, and the flue gas with the $CO_2$ concentration of about 12% (volume) is quantitatively collected.

The flue gas with a dust content of about 150 mg/m$^3$, a temperature of about 180° C., and a $CO_2$ concentration of about 12% (volume) enters into a thin steel pipe cooling apparatus connected in series. The thin steel pipe is 20# ordinary carbon steel, the diameter is 23 cm, and the serially connected length is 100 m. Radiating fins are welded outside the outer wall of the thin steel pipe to enhance the radiating rate, and flue gas blocking boards are mounted at the inner wall of the thin steel pipe to ensure the effect of cooling the flue gas, reducing the temperature to about 45° C.

An electrical dust remover with a specification of 1.2 m/s is disposed within the air-cooling apparatus connected in series. After the flue with a dust content of about 150 mg/m$^3$, a temperature of about 45° C., and a $CO_2$ concentration of about 12% (volume) passed through the air-cooling apparatus, the dust content of the air-cooling apparatus is reduced to about 100 mg/m$^3$.

The flue gas with a dust content of about 100 mg/m$^3$, a temperature of about 45° C., and a $CO_2$ concentration of about 12% (volume) enters into a gas storing and pressurizing apparatus by a screw air compressor to increase the pressure to 0.4-0.6 MPa. The flue gas firstly enters into a gas holder which is 140 m$^3$ in volume to store enough flue gas containing $CO_2$ for producing ammonium bicarbonate. Then the flue gas is fed into a pressurizing input pump, and the pressure is increased to about 0.9 MPa.

The flue gas with a temperature of 45° C., a pressure of about 0.9 MPa, a dust content of about 100 mg/m$^3$, and a $CO_2$ concentration of about 12% (volume) finally enters into an ammonium bicarbonate synthesizing apparatus. The flue gas firstly enters into the bottom of a carbonization main column, contacts in a counter flow with solution of a carbonization auxiliary column (ammonia water with a concentration of 6%) which enters from the top of the carbonization main column to absorb most of the $CO_2$; the unabsorbed flue gas with a $CO_2$ concentration of about 4% (volume) is discharged from the top of the carbonization main column and enters into the bottom of the carbonization auxiliary column, contacts in a counter flow with the concentrated ammonia water with a concentration of 10% which enters from the top of the carbonization auxiliary column to continue to absorb $CO_2$; the exhaust gas containing about 0.4% of $CO_2$, a small amount of $NH_3$ and $H_2S$ is discharged from the top of the carbonization auxiliary column, enters into the lower fixed section of a comprehensive column, wherein $CO_2$ and $H_2S$ are absorbed by dilute ammonia water, the flue gas after the absorption operation enters into the upper recovery and rinse section of the comprehensive column and $CO_2$ and ammonia in the flue gas are further absorbed by soft water, and the flue gas discharged from the top of the comprehensive column contains $CO_2 \leq 0.2\%$ (volume), ammonia$\leq 0.2$ g/Nm$^3$, and is then vented after energy recovery and depressurization; the dilute ammonia water in which the flue gas has been absorbed by the comprehensive column passes through a dilute ammonia water tank, and then enters into an ammonia water cycling tank to be mixed with mother liquid in the ammonia water cycling tank, enters into the upper ammonia absorber through the ammonia water pump, mixed with the raw ammonia gas, the ammonia gas is absorbed, and the liberated heat is removed by the cooling water in the ammonia absorbing cooling row, the resultant concentrated ammonia water enters into concentrated ammonia tank, and is then transported to the carbonization auxiliary column by a concentrated ammonia water pump; the ammonium bicarbonate solid suspension from the bottom carbonization main column is led out with reduced pressure, fed into the thickener, then the final product of ammonium bicarbonate and mother liquid are obtained after separation with the centrifuge, the mother liquid is sent back to the ammonia water cycling tank and then sent back to the ammonia absorbing system by the ammonia water pump.

The generated ammonium bicarbonate solid suspension is led out from the bottom of the carbonization main column, in which the ratio of solid-to-liquid is 6:4. The generated ammonium bicarbonate solid suspension is led out with reduced pressure from the bottom of the carbonization main column through a way selected from a continuous process or a batch process. The discharged ammonium bicarbonate solid suspension is fed into a thickener. The crystallized ammonium bicarbonate is increased in amount in the thickener, and then is separated by a centrifuge to generate the final product of ammonium bicarbonate and mother liquid. The mother liquid is sent back to a crystal-liquid tank and the crystal-liquid precipitation may further proceed. And then the crystallized ammonium bicarbonate is obtained thorough a centrifuge. On the basis of the ammonium bicarbonate producing device, a system for dissolving, storing and incorporating additives (nano-carbon and DCD) can be introduced into the device such that a co-crystallization product of a mixture with ammonium bicarbonate can be produced i.e., a nano-carbon long-sustaining fertilizer is produced.

By using a carbonization column with a diameter of 2.8 m, 5.6 ton ammonium bicarbonate can be produced every hour, 135 ton ammonium bicarbonate can be produced every 24 hours, and 45,000 ton ammonium bicarbonate can be produced every year.

Preferably, by dissolving ammonium stabilizer dicyanocabamidine (DCD) by an amount of 0.2%~1.0% and nano-carbon (NMC) by an amount of 0.1%~1.0% in concentrated ammonia water in accordance with a scientific addition amount, and then reacting with $CO_2$ in flue gas, long effective ammonium bicarbonate may be yielded. While the concentrated ammonia water compounding with $CO_2$ contained in the flue gas to form long effective ammonium bicarbonate, the dicyanoacabamidine (DCD) and nano-carbon (NMC)

will crystallize in the form of cocrystal or mixture etc, at the same time, yielding long effective ammonium bicarbonate.

It will be understood by those skilled in the art from the above description: the broad techniques of the embodiments of the present invention may be carried out in multiple forms. Therefore, although the embodiments of the invention have been described in combination with specified example, the true spirit of the invention should not be limited herein, since those skilled in the art will understand other modified schemes after studying the appended drawings, description and appended claims.

The invention claimed is:

1. A method for preparing ammonium bicarbonate with flue gas, comprising:
   (1) quantitatively collecting flue gas with a carbon dioxide concentration of about 8% to about 15% (volume) by a flue gas collecting apparatus disposed downstream of an exhaust outlet of a boiler;
   (2) decreasing the temperature of the flue gas to about 50° C. or less with an air-cooling apparatus disposed downstream of the flue gas collecting apparatus, wherein the air-cooling apparatus comprises an air-cooling channel, the air-cooling channel is a piping which comprises at least one thin steel pipe with a pipe wall thickness of about 3 to about 4 mm and an outer diameter of about 20 to about 30 cm;
   (3) increasing the pressure of the flue gas to about 0.6 to about 1.2 MPa with a gas storing and pressurizing apparatus; and
   (4) allowing the pressurized flue gas to react with ammonia to produce the ammonium bicarbonate in an ammonium bicarbonate synthesizing apparatus.

2. The method of claim 1, wherein the dust content of the flue gas is decreased to less than about 150 mg/m$^3$ before the step (2).

3. The method of claim 1, wherein the dust content of the flue gas is decreased to less than about 100 mg/m$^3$ at the same time of the step (2).

4. The method of claim 1, wherein the dust content of the flue gas is decreased to less than about 45 mg/m$^3$.

5. The method of claim 2, wherein the dust content of the flue gas is decreased to less than about 45 mg/m$^3$.

6. The method of claim 1, wherein the temperature of the flue gas of the step (1) is about 150 to about 200° C.

7. The method of claim 1, wherein the flue gas of the step (1) is provided by controlling the amount of inlet gas at a boiler entrance.

8. The method of claim 1, wherein the flue gas of the step (1) is derived from the flue gas of a boiler burning coal, natural gas, petroleum, or from the exhaust gas of incinerating biomaterial.

9. The method of claim 7, wherein the boiler is a coal-burning boiler of a thermal power plant.

10. The method of claim 8, wherein the flue gas of the step (1) is a flue gas with a carbon dioxide concentration of about 10% to about 15% (volume).

11. The method of claim 8, wherein the biomaterial is straw or town refuse.

12. The method of claim 1, wherein the ammonia of the step (4) is ammonia water with a concentration of more than about 170 titter.

13. A device for preparing ammonium bicarbonate with flue gas having a carbon dioxide concentration of about 8% to about 15% (volume) comprising:
   (1) a flue gas collecting apparatus disposed downstream of an exhaust outlet of a boiler for quantitatively collecting flue gas;
   (2) an air-cooling apparatus disposed downstream of the flue gas collecting apparatus for decreasing the temperature of the flue gas to about 50° C. or less, wherein the air-cooling apparatus comprises an air-cooling channel, the air-cooling channel is a piping which comprises at least one thin steel pipe with a pipe wall thickness of about 3 to about 4 mm and an outer diameter of about 20 to about 30 cm;
   (3) a gas storing and pressurizing apparatus for storing the cooled flue gas and increasing the pressure of the cooled flue gas to about 0.6 to about 1.2 MPa; and
   (4) an ammonium bicarbonate synthesizing apparatus for allowing the pressurized flue gas to react with ammonia to produce the ammonium bicarbonate.

14. The device of claim 13, wherein the flue gas collecting apparatus comprises a partitioning plate and a valve mounted at the exhaust outlet of the boiler for shunting flue gas.

15. The device of claim 13, wherein the thin steel pipe is made of 20# ordinary carbon steel.

16. The device of claim 13, wherein the piping comprises more than one thin steel pipes, which may be connected in parallel or in series.

17. The device of claim 15, wherein the thin steel pipes are connected in series, and an overall length of the thin steel pipes is about 80 to about 120 m.

18. The device of claim 15, wherein the thin steel pipes are connected in parallel, each of the thin steel pipes is about 30 m in length, and the number of the thin steel pipes is about 20 to about 40.

19. The device of claim 13, wherein the device further comprises a dust removing apparatus disposed between the flue gas collecting apparatus and the air-cooling apparatus.

20. The device of claim 19, wherein the dust removing apparatus is an electrical dust removing apparatus.

21. The device of claim 13, wherein the volume of the gas holder is about 100 to about 150 m$^3$.

* * * * *